(12) United States Patent
Montoya et al.

(10) Patent No.: US 8,749,871 B2
(45) Date of Patent: Jun. 10, 2014

(54) ON-CHIP MINIATURE OPTICAL ISOLATOR

(75) Inventors: Juan C. Montoya, Belmont, MA (US);
Steven J. Spector, Lexington, MA (US);
Reuel Swint, Billerica, MA (US);
Caroline A. Ross, Arlington, MA (US)

(73) Assignee: Massachusetts Institute of Technology,
Cambridge, MA (US)

( * ) Notice: Subject to any disclaimer, the term of this patent is extended or adjusted under 35 U.S.C. 154(b) by 0 days.

(21) Appl. No.: 13/414,289

(22) Filed: Mar. 7, 2012

(65) Prior Publication Data
US 2012/0236389 A1   Sep. 20, 2012

Related U.S. Application Data

(60) Provisional application No. 61/452,747, filed on Mar. 15, 2011.

(51) Int. Cl.
*G02F 1/09* (2006.01)
(52) U.S. Cl.
CPC ...................................... *G02F 1/093* (2013.01)
USPC .............................. 359/280; 359/324; 385/30
(58) Field of Classification Search
USPC ................ 372/703; 359/237–324; 385/14, 30
See application file for complete search history.

(56) References Cited

U.S. PATENT DOCUMENTS

| | | | |
|---|---|---|---|
| 2002/0051615 | A1 | 5/2002 | Walpole et al. |
| 2005/0169582 | A1* | 8/2005 | Tan et al. ........................ 385/50 |
| 2008/0267557 | A1* | 10/2008 | Wang et al. ..................... 385/16 |
| 2011/0002573 | A1* | 1/2011 | Yu et al. ............................ 385/2 |
| 2012/0002914 | A1* | 1/2012 | Kroemer et al. ................ 385/14 |

FOREIGN PATENT DOCUMENTS

JP          06051241 A      2/1994

OTHER PUBLICATIONS

Ming-Chun Tien et al. "Silicon ring isolators with bonded nonreciprocal magneto-optic garnets" Jun. 2011 Optics Express. vol. 19, No. 12, pp. 11740-11745.*
Kono et al. "Nonreciprocal microresonators for the miniaturization of optical waveguide isolators" Jun. 2007 Optics Express vol. 15, No. 12, pp. 7737-7751.*
Bryan et al., Fibre optic modulators using active multimode waveguide overlays, May 23, 1991, pp. 894-896, vol. 27 No. 11, Electronics Letters.
Kono et al., Nonreciprocal micro-ring resonator for the miniaturization of optical waveguide isolators, 2006, 3 pages, Optical Society of America.
Marcatili, Slab-coupled waveguides, Apr. 1974, pp. 645-674, vol. 53 No. 4, The Bell System Technical Journal, U.S.A.
Marcuse et al., Investigation of coupling between a fiber and an infinite slab, Jan. 1989, pp. 122-130, vol. 7 No. 1, Journal of Lightwave Technology.
Montoya et al., Surface plasmon isolator based on nonreciprocal coupling, Jul. 23, 2009, pp. 023108-1-023108-6, vol. 106, Journal of Applied Physics.

(Continued)

*Primary Examiner* — Darryl J Collins
*Assistant Examiner* — Gary O'Neill
(74) *Attorney, Agent, or Firm* — Gesmer Updegrove LLP (57) ABSTRACT

An optical structure for generating nonreciprocal loss is provided that includes a first substrate layer and a magneto-optical layer positioned on the first substrate layer. The magneto-optical layer achieves nonreciprocity with application of an external magnetic field so as to produce resonantly enhanced nonreciprocal loss.

18 Claims, 5 Drawing Sheets

(56) References Cited

OTHER PUBLICATIONS

Shintaku, Integrated optical isolator based on efficient nonreciprocal radiation mode conversion, Oct. 5, 1998, pp. 1946-1948, vol. 73 No. 14, Applied Physics Letters.

Vallee et al., Coupling between an optical fiber and a planar waveguide, May 15, 1996, pp. 293-307, vol. 126, Optics Communications.

Walpole, Slab-coupled optical waveguide lasers: a review, 2004, pp. 124-132, vol. 5365, Proceedings of SPIE.

International Search Report and Written Opinion issued on Aug. 17, 2012 in connection with International Application PCT/US2012/028066, 12 pages.

International Preliminary Report on Patentability and Written Opinion of the International Searching Authority issued on Sep. 26, 2013 in connection with International Application PCT/US2012/028066, 12 pages.

* cited by examiner

ON-CHIP MINIATURE OPTICAL ISOLATOR

PRIORITY INFORMATION

This application claims priority from Provisional Application Ser. No. 61/452,747 filed Mar. 15, 2011, which is incorporated herein by reference in its entirety.

This invention was made with government support under Contract No. FA8721-05-C-0002 awarded by the U.S. Air Force and under Grant No. DMR-0604430 awarded by the National Science Foundation. The government has certain rights in this invention.

BACKGROUND OF THE INVENTION

The invention is related to the field of optical isolators, and in particular to a slab coupled optical waveguide to form an optical isolator, where the slab coupled optical waveguide includes a magneto-optic material to achieve nonreciprocal loss.

Since the invention of diode lasers in 1962, researchers have sought to increase the power available from them in a single spatial mode. Because of their high brightness, single-mode diode lasers have many advantages for a variety of applications. Single-mode, high-power diode lasers are used to pump erbium-doped fiber amplifiers that are essential to fiber optical communications. Others pump fiber lasers in a number of commercial and industrial applications, but the amount of pump light that can be coupled into the fiber is generally limited by the diode's low beam quality.

In another example, diode lasers are of interest for being used directly in materials processing, and their efficacy depends on their brightness because the beam intensity on a distant work piece can be dramatically increased by increasing the source's brightness. Brightness is also important for diode lasers in free-space optical communications because the fractional amount of the transmitter's light that reaches the receiver is proportional to brightness.

Numerous methods have been employed to boost the single-mode output power from a diode laser. Although the power that is available from conventional single-mode ridge lasers keeps rising, these increases have been incremental, and optical loss and heat removal impose definite limitations. Moreover, ridge-waveguide lasers usually have highly elliptical beams that diverge much more rapidly in one axis than in the other. External optics are necessary to couple these beams into a single-mode fiber.

Tapered lasers have been developed to increase the mode in the lateral direction while keeping the device in a single mode. These lasers use an adiabatic taper along their length to enlarge the optical mode, but these structures suffer from beam instability problems at high powers, and heroic optics are needed to couple the astigmatic output beam to a fiber.

In a slab coupled optical waveguide laser (SCOWL), the beam is expanded in the transverse (Y) direction, perpendicular to the plane of the device, such that the fast and slow directions of the laser mode can be made nearly equal in dimension. A thin gain region carefully placed within a large, low-loss, passive waveguide results in a low modal loss, which allows the construction of longer devices, spreading out the heat and reducing series resistance. The net result is high power in large, nearly circular, diffraction-limited mode. This mode profile is ideally suited, for example, for efficient coupling into a single-mode fiber. The brightness (B) of a laser is expressed by:

$$B = P/(\lambda^2 M_x^2 M_y^2),$$

where P is the power emitted from the laser, $\lambda$ is the laser wavelength and $Mx^2$ and $My^2$ are the beam quality parameters in the vertical and horizontal directions, respectively. Clearly, brightness is highest for the lowest mode order. Brightness is the metric that measures, for example, the amount of power that can be delivered on a far-field target. The differences in brightness between multimode and single-mode lasers can be large; e.g., a typical multimode pump laser with P=1 W, $\lambda$=1 µm, $Mx^2$=1, and $My^2$=20 has B=5 MW/cm2-sr. On the other hand, a single-mode laser—e.g., a SCOWL—with P=1 W, $\lambda$=1 µm, and $Mx^2$=$My^2$=1 has B=100 MW/cm2-sr. The multimode laser would have to be 20 times more powerful than the single-mode one to produce equivalent brightness.

The SCOWL uses the concept of slab coupling in which high-order modes of a large waveguide are filtered out by coupling to slab modes, thereby transforming this multimode waveguide into a single-mode one. More than 30 years ago, Enrique A. J. Marcatili used the coupled-mode theory to show that an arbitrarily large slab-coupled passive waveguide should be possible. Marcatili demonstrated that a large, round fiber can propagate many modes, but when the fiber is brought close to the slab, its modes couple to those of the slab. If only the lowest-order fiber mode has a propagation constant higher than the propagation constants of the slab mode ($\beta$z-slab in the figure), the high-order fiber modes will couple to the slab, leaving the composite structure with only one bound mode; that is, the composite structure will be single-moded.

Marcatili's analysis is straightforward, but reality is more complicated. Even though there is only one true bound mode, other slowly decaying, or "leaky," modes can exist. These can be problematic in lasers, but they are often an issue even in purely passive guides because they can be inadvertently excited at the input, and it takes a long distance for them to radiate away. Propagation in curved waveguides really occurs via leaky modes, as does propagation in AlGaAs waveguides on GaAs substrates, because the substrate has an index greater than or equal to that of the guide.

For good single-mode operation in a slab-coupled guide, all potential leaky modes should couple efficiently into the slab so that they will radiate away quickly. If they don't couple efficiently and their coupling loss is less than their gain, they will reach threshold and oscillate. For the leaky modes to be sufficiently lossy, they must be well-coupled to one or more slab modes that have higher propagation constants

SUMMARY OF THE INVENTION

According to one aspect of the invention, there is provided an optical structure for generating nonreciprocal loss. The optical structure includes a cladding layer and a magneto-optical layer positioned on the cladding layer. The magneto-optical layer achieves nonreciprocity with application of an external magnetic field so as to produce a nonreciprocal index resulting in a nonreciprocal coupling induced loss in a neighboring waveguide in proximity to the magneto-optical layer.

According to another aspect of the invention, there is provided an optical isolator. The optical isolator includes a bus structure that receives as input an optical signal, and a microring structure being resonantly coupled to the bus structure. An optical structure is positioned on/around the microring structure. The optical structure generates nonreciprocal loss so as to allow the microring structure to achieve a particular optical isolation and insertion. The optical structure includes a cladding layer and a magneto-optical layer positioned on the cladding layer. The magneto-optical layer achieves nonreciprocity with application of an external magnetic field so as to produce a nonreciprocal index resulting in a nonreciprocal coupling induced loss in the microring structure.

According to another aspect of the invention, there is provided a method for producing nonreciprocity in an optical structure. The method includes providing a cladding layer and providing an external magnetic field. Also, the method includes positioning a magneto-optical layer on the cladding layer. The magneto-optical layer achieves nonreciprocity with application of the external magnetic field so as to produce a nonreciprocal index resulting in a nonreciprocal coupling induced loss in a neighboring waveguide in proximity to the magneto-optical layer.

DETAILED DESCRIPTION OF THE INVENTION

The invention involves a slab coupled optical waveguide to form an optical isolator, where the slab coupled optical waveguide includes a magneto-optic material to achieve nonreciprocal loss. The slab coupled waveguide approach eliminates the zero birefringence requirement that has limited previous approaches and uses high-quality thin magneto-optic films, which are compatible with III-V and silicon photonic platforms. Also, the invention incorporates this device into a microring architecture to resonantly enhance the nonreciprocal loss to achieve greater than 30 dB optical isolation and less than 3 dB insertion loss. The microring thereby uses resonant enhancement to enhance the weak magneto-optic effect.

Figure 1A:
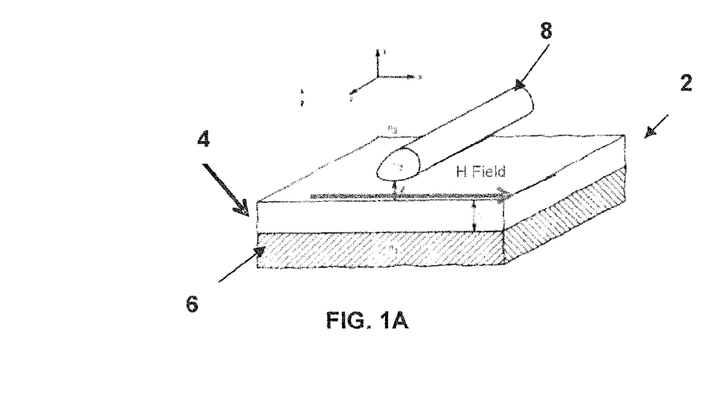
FIGS. 1A-1B are a schematic diagram and graph illustrating the inventive nonreciprocal loss structure and its respective performance.

The key component of the optical isolator concept is a nonreciprocal loss structure suitable for integration into a microring resonator. A schematic of the inventive nonreciprocal loss structure 2 is illustrated in FIG. 1A, and is modified from the standard slab coupled waveguide design. In this design, a guided mode is coupled into a slab 4 to achieve coupling induced losses. The slab 4 acts as a mode sink. The invention involves incorporating magneto-optic materials into the slab 4 to achieve nonreciprocity with the application of an external magnetic field H. The slab 4 is positioned on a cladding layer 6, where the slab 4 includes one or more magneto-optic thin film layers that are compatible with III-V, glass, or silicon photonic platforms. The cladding layer 6 can include SiN, Si, GaAs, InP or other glass, or H-IV semiconductor materials. A round fiber 8, allowing for a plurality model, is positioned above the nonreciprocal loss structure 2 to demonstrate the coupling of the modes, as an example. It is noted a nonreciprocal loss is produced in result of a nonreciprocal index being generated in the area where portions of the fiber 8 is in close proximity to the slab 4 and cladding 6.

Figure 1B:
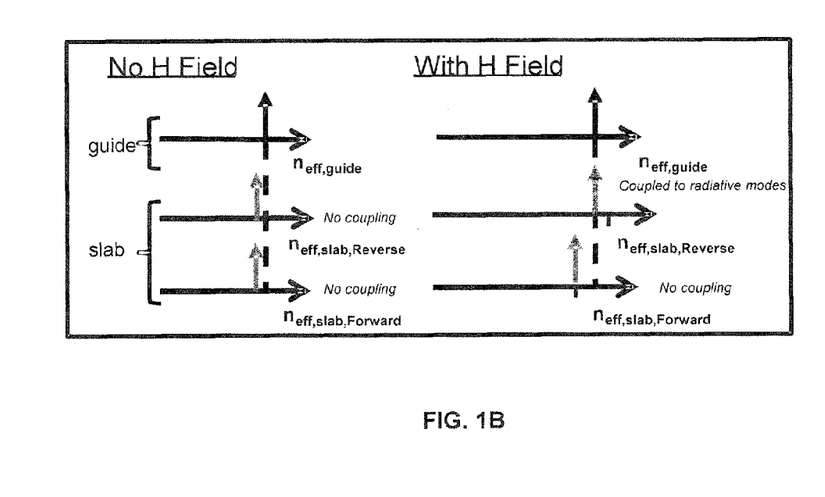

In FIG. 1B, in the absence of a magnetized magneto-optic material, a single guided mode can be designed such that it does not overlap in index with the guided mode of the slab 4. In addition, in the absence of internal magnetization of the material, the forward and reverse slab modes are degenerate. When the external magnetic field H is applied, the magneto-optic medium becomes magnetized. The degeneracy of the forward and reverse modes in the slab 4 is broken, and the slab 4 exhibits nonreciprocal modal indices. In the forward direction, the guided mode can be designed such that a mismatch exists between the guided mode index and the slab mode index. In the reverse direction, the indices are matched, and a coupling-induced loss into the slab mode occurs. Using this phenomenology, a nonreciprocal loss in the slab-coupled device 2 is achieved.

While such a nonreciprocal loss structure 2 can theoretically achieve greater than 30 dB of optical isolation, it is anticipated that practical fabrication tolerances can limit the isolation achievable. In order to enhance the level of isolation, the invention integrates the nonreciprocal loss structure 2 into a microring resonator.

Figure 2A:
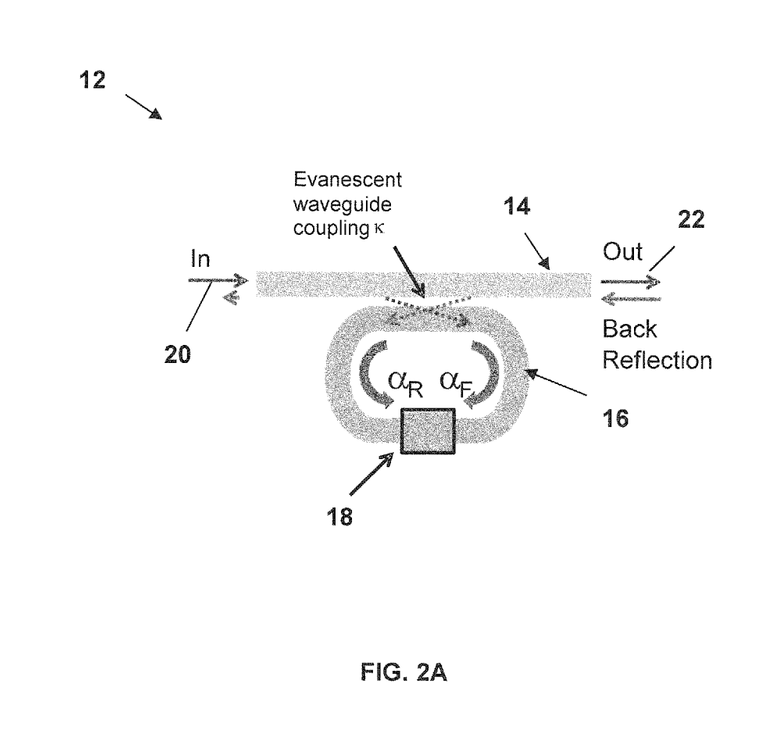
FIGS. 2A-2B are a schematic diagram and graph illustrating the inventive microring structure using the nonreciprocal loss structure and its respective performance.
Figure 2B:
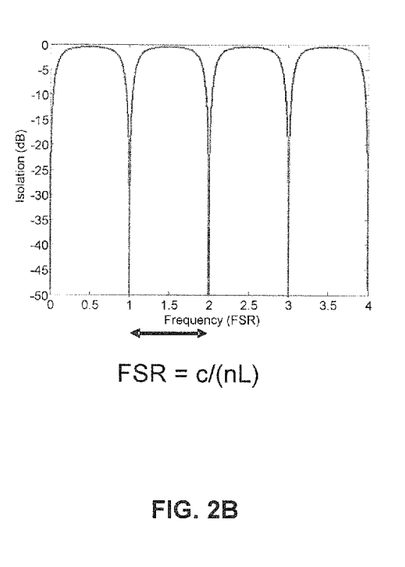

FIG. 2A is a schematic diagram illustrating the inventive integrated microring optical isolator 12. An input optical signal 20 is transmitted through a bus waveguide 14. For complete coupling into a microring resonator 16 to occur two conditions must be satisfied: (a) resonance and (b) matching the coupling κ to the single pass loss α. The latter condition is referred to as the critical coupling condition. A nonreciprocal loss structure 18 is inserted around/into the microring 16. In the forward direction, a mismatch exists ($\kappa \neq \alpha_F$) between the coupling and single pass loss, so poor coupling occurs and most of the light travels down the bus waveguide 14 and provided as an output signal 22. In the reverse direction, on resonance, and with $\kappa = \alpha_R$ the critical coupling condition is satisfied resulting in complete power transfer from the bus waveguide 14 into the microring 16 providing infinite isolation. In this case, the output signal 22 can include back reflection. FIG. 2B is a graph illustrating the free spectral range (FSR) of the optical isolator 12

Figure 3:
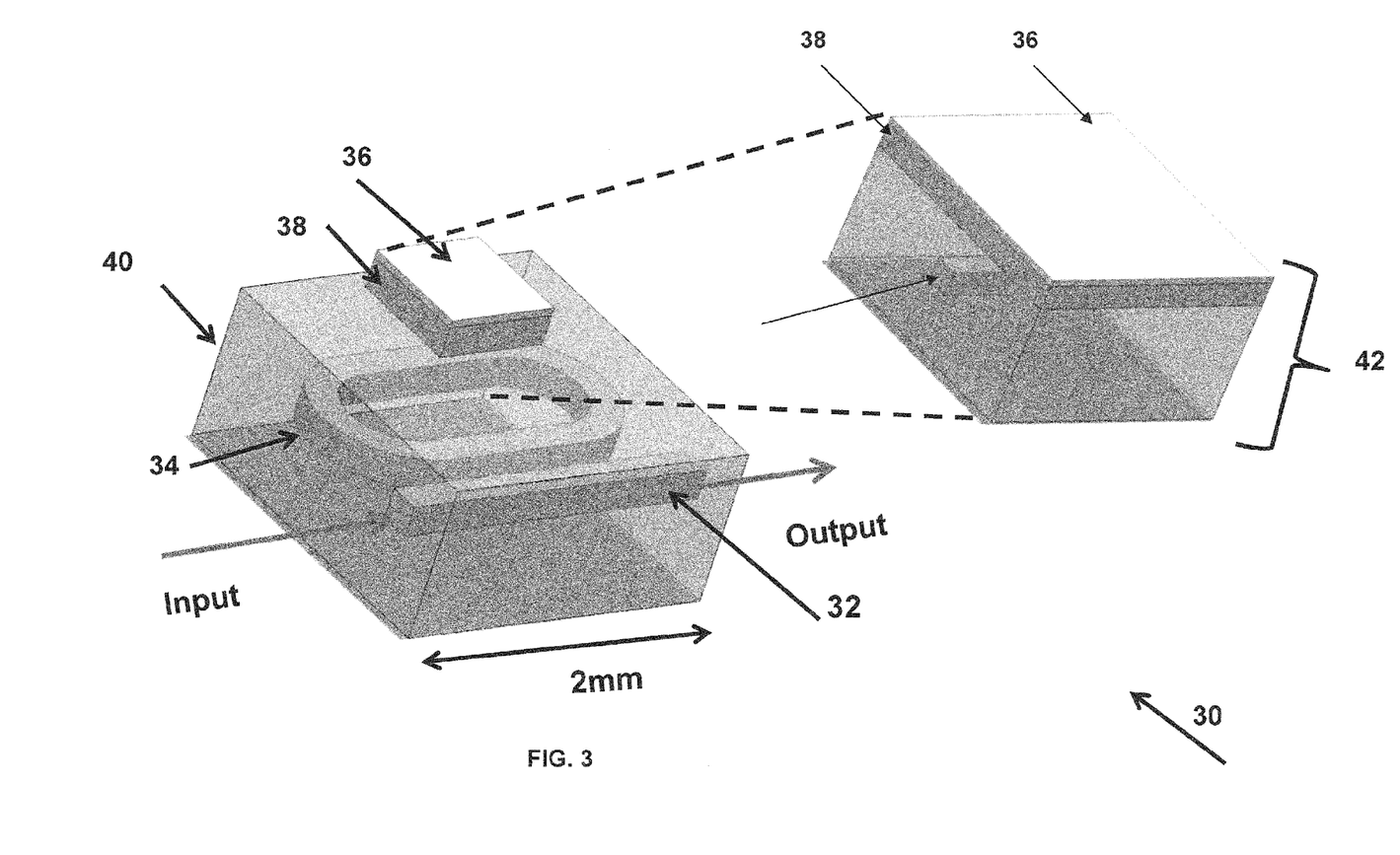
FIG. 3 is a schematic diagram illustrating a detailed view of the inventive microring structure used in accordance with the invention.

A schematic for the implementation of an optical isolator 30 is presented in FIG. 3. It shows a bus waveguide 32, a microring 34, and a magneto-optical film 36 providing nonreciprocal index being positioned on a substrate 38 having SiN to form a nonreciprocal loss structure 42. Light traveling along the bus waveguide 32 in the reverse direction is critically coupled to the loss in the microring 34 presented by the nonreciprocal loss structure 42 having a Ce:Y IG film. The bus waveguide 32 and microring 34 are enclosed in a layer 40 of $SiO_xN_y$, or similar materials. The nonreciprocal loss structure 42 is positioned on the layer 40. It is noted a nonreciprocal loss resulting from a nonreciprocal index being generated in the area where portions of the microring 32 is in close proximity to the nonreciprocal loss structure 42.

Figure 4A:
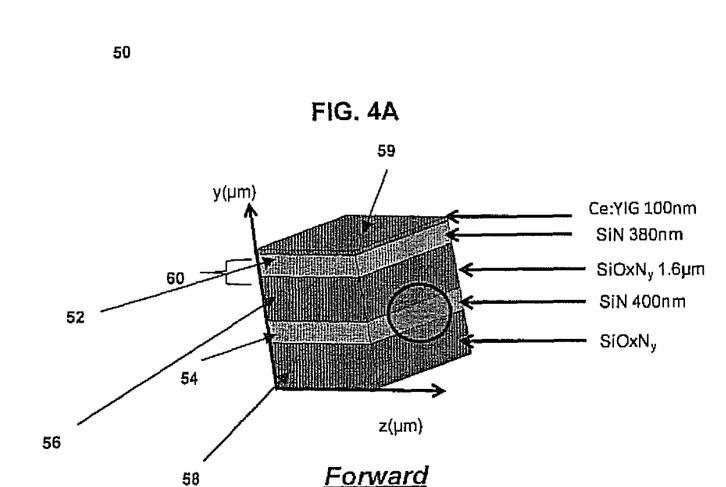
FIG. 4A-4D are a schematic diagram and graphs illustrating an optical isolator and it respective performance.
Figure 4B:
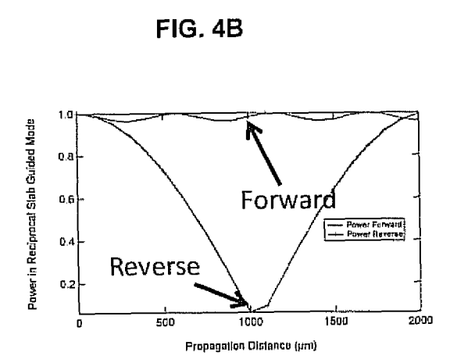

The success of the optical isolator 30 hinges on demonstration of the key nonreciprocal loss structure 42. The nonreciprocal slab coupling can be simulated by extending the well understood directional coupler (coupled waveguide) theory to the case where one of the waveguides becomes nonreciprocal. Incorporating the magneto-optic effect can be performed analytically in 1-D by solving Maxwell's equations with a permittivity tensor that incorporates the off-diagonal magneto-optic terms. FIGS. 4A-4B illustrate the results of a simulation for a 1-D prototype structure having of two slabs 52, 54. One of the two coupled slabs 52 incorporates a magneto-optic film (Ce:YIG) 59 that forms a nonreciprocal index structure 60 which results in a nonreciprocal coupling induced loss index. The slabs 52, 54 are positioned between layers 56, 58 of SiOxNy, as shown in FIG. 4A. As illustrated in FIG. 4B, the nonreciprocal loss structure 60 can achieve complete power transfer out of the guiding SiN slab 54 in the reverse direction resulting in perfect isolation. In the forward direction, the waveguides are detuned resulting in low insertion loss.

Figure 4C:
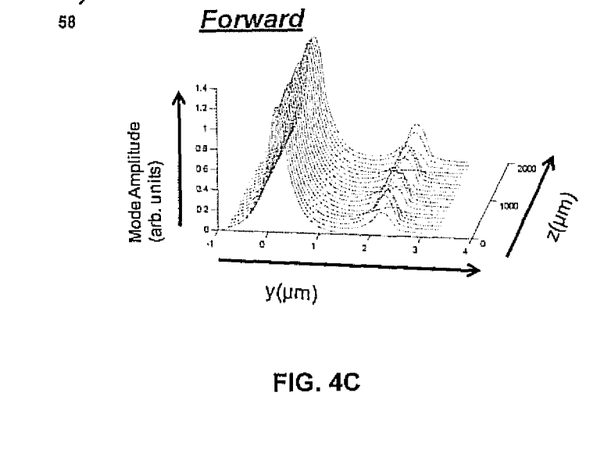
Figure 4D:
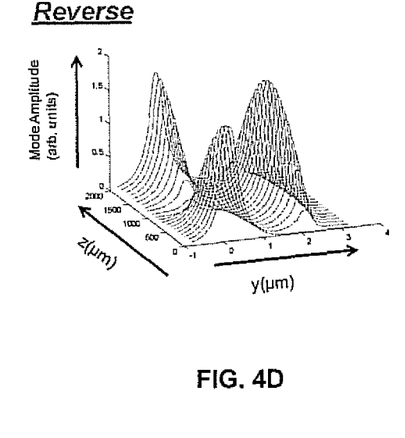

The forward and reverse guided mode is illustrated in FIGS. 4C-4D respectively as function of propagation distance. As shown, complete power transfer occurs in a distance of approximately 1 mm. It should also be noted that while the nonreciprocal loss structure can act as a stand-alone optical isolator, incorporating the nonreciprocal loss structure into a microring resonator allows for resonant enhancement of the nonreciprocal loss which will provide considerable margin and allow for achieving large isolation in spite of fabrication errors. This provides support that wavelength dispersion (or thermal tuning) can compensate for fabrication errors. The fabrication tolerances are characterized on the nonreciprocal loss performance and can optimize the baseline design to minimize sensitivity to fabrication errors.

While the simulated nonreciprocal loss structure could serve as an optical isolator in and of itself, the microring resonant enhancement of the nonreciprocal loss can allow for enhanced isolation and reduced sensitivity to fabrication errors. Here, the key requirements the microring resonator imposes on the nonreciprocal loss structure are described to achieve 30 dB optical isolation and 3 dB insertion loss as shown in FIG. 5.

Figure 5:
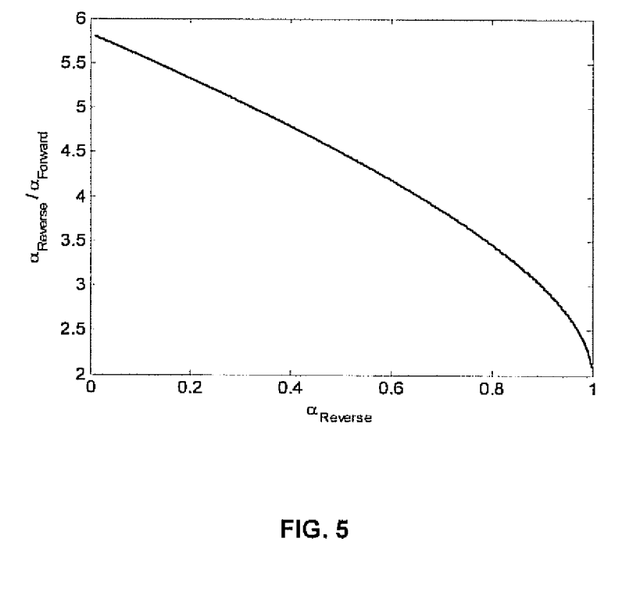
FIG. 5 is a graph illustrating the ratio of the reverse to forward loss required in the inventive microring resonator to achieve 30 dB isolation and 3 dB insertion loss.

In FIG. 5, the reverse single pass power loss in the microring ($\alpha_{Reverse}$) is assumed to match the coupled power in the coupling section of the microring resonator to achieve critical coupling. As the loss in the microring resonator increases in the reverse direction (shown as a percent of the single pass transmitted light where T+$\alpha_{Reverse}$=1), the ratio of the reverse loss to the forward loss ($\alpha_{Forward}$) required to achieve 3 dB insertion loss decreases. As illustrated, only a factor of three nonreciprocal loss is required to achieve a 3 dB insertion loss and infinite isolation on resonance for a reverse loss of 90% per pass in the microring ($\alpha_{Reverse}$=0.9).

The results in FIG. 5 illustrate that for a modest nonreciprocal loss (~3) significant resonant enhancement can be achieved (theoretically infinite extinction on resonance). The results of the simulations shown in FIGS. 4B-4D support that one can achieve significantly greater than the factor of three nonreciprocal loss that is required to achieve infinite rejection and a 3 dB insertion loss. The invention therefore allows for significant margin in the performance of the nonreciprocal loss structure which will reduce the sensitivity to fabrication tolerances. Based on the modeling provided, the invention allows for one to design a nonreciprocal loss structure to achieve greater than a factor of three nonreciprocal loss to achieve over 30 dB isolation, less than 3 dB insertion loss, with over 900 MHz of 30 dB isolation bandwidth, at a design operating point of $\alpha_{Reverse}$=0.9.

There are at least two novel concepts at the core of the invention that seek to overcome the latter challenges of the prior art. The first novel concept is to use a slab coupled optical waveguide, where the slab includes a magneto-optic material to achieve nonreciprocal loss. The slab coupled waveguide approach eliminates the zero birefringence requirement that has limited previous approaches and uses high-quality thin magneto-optic film, which are compatible with III-V and silicon photonic platforms. The second novel concept is to incorporate this device into a microring architecture to resonantly enhance the nonreciprocal loss to achieve greater than 30 dB optical isolation and less than 3 dB insertion loss. The microring thereby uses resonant enhancement to enhance the weak magneto-optic effect. The invention can be integrated into an on-chip coherent beam combining system—the utility of integrated optical isolators to beam-combined semiconductor amplifier arrays.

Although the present invention has been shown and described with respect to several preferred embodiments thereof, various changes, omissions and additions to the form and detail thereof, may be made therein, without departing from the spirit and scope of the invention.

What is claimed is:

1. An optical structure for generating nonreciprocal loss comprising:
    a cladding layer; and
    a magneto-optical layer positioned on the cladding layer, the magneto-optical layer is incorporated into at least one slab positioned on said cladding layer and achieves nonreciprocity with application of an external magnetic field so as to produce a nonreciprocal index resulting in a nonreciprocal coupling induced loss in a neighboring waveguide in proximity to the magneto-optical layer, said neighboring waveguide requires conditions for complete coupling, said conditions include resonance and matching the coupling to a single pass loss.

2. The optical structure of claim 1, wherein the magneto-optical layer comprises one or more magnetic thin film layers.

3. The optical structure of claim 2, wherein the one or more magnetic thin film layers comprise Ce:YIG thin films.

4. The optical structure of claim 1, wherein the cladding layer comprises SiN, Si, GaAs, InP or other III-V, glass, or II-IV semiconductor materials.

5. The optical structure of claim 1, wherein the magneto-optical layer comprises one or more magneto-optic films that are compatible with III-V, glass, or silicon photonic platforms.

6. The optical structure of claim 1, wherein the magneto-optical layer comprises one or more magneto-optic films that are compatible with III-V and silicon photonic platforms.

7. An optical isolator comprising:
    a bus structure that receives as input an optical signal;
    a microring structure that is resonantly coupled to the bus structure; and
    an optical structure positioned in close proximity to the microring structure, the optical structure generates nonreciprocal loss, said optical structure provides optical isolation so as to allow the microring structure to achieve a particular optical isolation and insertion loss, the optical structure comprises a cladding layer and a magneto-optical layer, said magneto-optical layer is incorporated into at least one slab, said at least one slab is positioned on the cladding layer, the magneto-optical layer achieves nonreciprocity with application of an external magnetic field so as to produce a nonreciprocal index resulting in a nonreciprocal coupling induced loss in the microring structure, said microring structure requires conditions for complete coupling, said conditions include resonance and matching the coupling to a single pass loss.

8. The optical isolator of claim 7, wherein the magneto-optical layer comprises one or more magnetic thin film layers.

9. The optical isolator of claim 8, wherein the one or more magnetic thin film layers comprise Ce:YIG thin films.

10. The optical isolator of claim 7, wherein the cladding layer comprises SiN, Si, GaAs, InP or other III-V, glass, or II-IV semiconductor materials.

11. The optical isolator of claim 7, wherein the magneto-optical layer couples a guided mode from a first waveguide structure to achieve nonreciprocal loss.

12. The optical isolator of claim 7, wherein the magneto-optical layer comprises one or more magneto-optic films that are compatible with III-V, glass, or silicon photonic platforms.

13. A method for producing nonreciprocity in an optical structure comprising:
providing a cladding layer;
providing an external magnetic field; and
positioning a magneto-optical layer on the cladding layer, the magneto-optical layer is incorporated into at least one slab positioned on said cladding layer and achieves nonreciprocity with application of the external magnetic field so as to produce a nonreciprocal index resulting in a nonreciprocal coupling induced loss in a neighboring waveguide in proximity to the magneto-optical layer, said neighboring waveguide requires conditions for complete coupling, said conditions include resonance and matching the coupling to a single pass loss.

14. The method of claim 13, wherein the magneto-optical layer comprises one or more magnetic thin film layers.

15. The method of claim 14, wherein the one or more magnetic thin film layers comprise Ce:YIG thin films.

16. The method of claim 13, wherein the cladding layer comprises SiN, Si, glass or other III-V or II-IV semiconductor materials.

17. The method of claim 13, wherein the magneto-optical layer couples a guided mode from a first waveguide structure to achieve nonreciprocal loss.

18. The method of claim 13, wherein the magneto-optical layer comprises one or more magneto-optic films that are compatible with III-V and silicon photonic platforms.

* * * * *